3,463,767
PROCESS FOR EMULSIFYING HIGH MOLECULAR WEIGHT POLYETHYLENE
Richard W. Bush, Laurel, and Thomas R. Marrero, Ellicott City, Md., assignors, by mesne assignments, to Allied Chemical Corporation, New York, N.Y., a corporation of New York
No Drawing. Continuation of application Ser. No. 513,556, Dec. 13, 1965. This application Dec. 4, 1967, Ser. No. 687,906
Int. Cl. C08f 47/16, 29/04
U.S. Cl. 260—94.9                    1 Claim

---

ABSTRACT OF THE DISCLOSURE

Oxidized polyethylene having improved emulsifiability, particularly in the wax-to-water technique of emulsification, may be prepared by oxidizing polyethylene in particulate form in the presence of $10^{-5}$ to $10^{-2}\%$, by weight based on the polyethylene, of cobalt or manganese as a carboxylate salt.

---

This is a continuation of application Ser. No. 513,556, filed Dec. 13, 1965, now abandoned.

This invention relates to the preparation of an emulsifiable polyethylene. More particularly this invention relates to the preparation of high molecular weight polyethylene that is emulsifiable by the conventional wax-to-water technique.

In the commercial field today, emulsions of polyethylene are formed predominantly by two methods. One method is an emulsion polymerization process where the ethylene monomer is polymerized at temperatures of 80–140°C. in an aqueous media in combination with an alcohol in the presence of emulsifying agents and a free radical type catalyst, e.g. potassium persulfate. The drawback to this method is that the entire output of polyethylene is in emulsion form with fixed emulsifier type and concentration thus restricting its end uses. The other emulsion-forming method employed on a wide scale is to oxidize polyethylene until sufficient carboxyl groups are present on the polymer chain and then emulsify the thus oxidized polyethylene in water at elevated temperatures using a wide variety of conventional emulsifying agents. In this latter method, the oxidation step used in producing most commercial polyethylene emulsions is performed in the melt, i.e. above the melting point of the polyethylene. However, melt oxidation of polyethylene has some serious drawbacks which ultimately limit the properties of coatings, impregnates, polishes, laminates etc. resulting from these melt oxidized polyethylene emulsions. One outstanding drawback is the fact that melt oxidation, except under critically defined conditions, causes the polyethylene to crosslink during the oxidation step. Crosslinking in turn causes two additional problems, namely (1) increased viscosity due to increased molecular weight and (2) gel structure in the polymer. Melt oxidation requires that the oxygen-containing gas be diffused readily, rapidly and at high concentrations into the molten polymer. If such diffusion is not rapid, the rate of oxidation is so slow as to be impractical to accomplish on a commercial scale. Increased viscosity due to crosslinking decreases the oxygen diffusion rate and thereby decreases the rate of oxidation in the melt. Thus from a practical viewpoint, the seriousness of this diffusion dependency on oxidation rate precludes the use of high molecular weight, i.e. above about 10,000 viscous polyethylenes as a starting material in the preparation of an oxidized polyethylene. The art, to maintain the viscosity of the molten polyethylene at a relatively low level while it is being oxidized and to avoid the predominance of the crosslinking reaction, starts with a low molecular weight polyethylene, i.e. 1000–10,000 and, further adds a very low molecular weight species of hydrocarbon such as paraffin or microcrystalline wax to the polyethylene prior to oxidation. See U.S. 2,952,649; 3,060,163; British 918,295 and French 1,323,476.

Crosslinking is a problem not only in the melt oxidation step but also in the subsequent emulsification of the thus oxidized polyethylene. Crosslinked oxidized polyethylene molecules generally are of low polarity and have gel networks that are substantially larger than the droplet size of the desired emulsions, a fact that precludes emulsification of the crosslinked polymer.

In a copending application assigned to the same assignee having Ser. No. 317,054 filed Oct. 17, 1963 it has been found possible to circumvent the requirement of the polyethylene having a low molecular weight by performing the oxidation while maintaining the polymer in the solid state. Oxidation of polyethylene at temperature below its melting point precludes crosslinking of the polymer. Thus one is able to avoid the above mentioned problems of melt oxidation by the practice of solid state oxidation. For example, the molecular weight of the starting polymer in solid state oxidation is not limited to low molecular weight material because of the viscosity problem encountered in melt oxidation. Nor is it necessary to add low molecular weight waxes to reduce the viscosity or inhibit crosslinking in solid state oxidation. Further the oxidation rate is not reduced since crosslinking to a gel condition does not occur and thereby increases the viscosity as in melt oxidation.

However, solid state oxidation of polyethylene has the drawback that the resulting oxidized products can only be emulsified in a pressurized system and not by the conventional wax-to-water method. The necessity of installing pressurized equipment in order to emulsify polyethylene which has been oxidized in the solid state has been a serious deterrent to their commercial acceptability.

Thus, one object of the instant invention is to produce an emulsifiable polyethylene of high molecular weight which has been oxidized in the solid state. Another object of the instant invention is to produce a low density polyethylene of high molecular weight which can be emulsified in the conventional wax-to-water method. These and further objects of the invention will become more readily apparent from the following detailed descriptions and discussions.

Surprisingly, it has now been discovered that polyethylene having a density up to 0.930 of any desired molecular weight, e.g. up to 1,000,000 or more, that is having a melt index in the range 0 to 100, can be emulsified by the conventional wax-to-water method after being subjected to solid state oxidation by adding a minor amount of a carboxylate salt of cobalt or manganese to the polymer prior to the solid state oxidation step.

The exact function of the carboxylate salt of cobalt or manganese is not known. However, it is believed that the addition of said salts to the polymer prior to oxidation results in a more uniform oxidation thereby affording increased emulsifiability. An additional advantage to the use of the carboxylate salt of cobalt or manganese in the system is a substantial increase in the rate of oxidation.

Since it is well known that carboxylate salts of cobalt or manganese do not initiate the formation of hydroperoxide groups any catalytic effect of the carboxylate salt of cobalt or manganese does not occur until sufficient hydroperoxide groups are generated. In order to generate the formation of hydroperoxide and to decrease the induction period it is possible, if desired, to add a minor amount, i.e. 0.05 to 5% by weight of the polyethylene of an organic peroxide, ozone, nitrogen tetroxide or other oxidation promoter to the polymer prior to the oxidation step. The addition of said agents will decrease the induction period prior to oxidation and thus allow the carboxylate salt of cobalt or manganese to become effective in a shorter period.

The general procedure for performing the instant invention is to blend the carboxylate salt of cobalt or manganese with polyethylene at a temperature above the melting point of the polymer, i.e. about 120–150° C. The blending is usually done on any conventional blender such as a Banbury mixer or a Brabender Plastograph. The blended product is then cooled and preferably ground into particulate form.

The solid state oxidation of the blended polyethylene can be carried out by various methods to give polyethylene which is readily emulsifiable by the wax-to-water technique. The oxidation is carried on until the polymer contains 0.1 to 2.0 milliequivalents carboxyl/g. of polymer which is the required carboxyl content necessary for emulsification. The techniques for introducing carboxyl groups into polyethylene are exemplified by, but not limited to, the following methods. One method would include passing an oxygen-containing gas into an oven over a solid blended polyethylene at a temperature ranging from 60° C. up to the crystalline melting point of the polymer. Still another method would be to suspend particles of polyethylene blended with the carboxylate salt of cobalt or manganese in water or an inert organic solvent and either bubble air through the suspension or pressurize the system with air at temperatures ranging from 60° C. up to the crystalline melting point of the polymer. Another method would be to pass an oxygen-containing gas at a temperature from 60° C. up to the crystalline melting point of the polymer through a fluidized bed of polyethylene particles blended with the carboxylate salt of cobalt and manganese. A still further method would be to tumble polyethylene in particle form blended with the carboxylate salt of cobalt or manganese in air in a ribbon blender at temperatures of 60° C. up to the crystalline melting point of the polyethylene.

In all the aforestated methods of oxidizing polyethylene, if desired, a minor amount, i.e. 0.05 to 5% by weight of the polyethylene of an organic peroxide, ozone, nitrogen tetroxide or other oxidation promotor may be blended with the polymer to eliminate the introduction period. When an oxidation promotor is employed, e.g. an organic peroxide, it is added to the polymer after the polymer is melt blended with a carboxylate salt of cobalt or manganese. The organic promoter is suitably added in a mixing mechanism, e.g. a twin shell blender at room temperature. Preferably the organic peroxide is solubilized in a hydrocarbon solvent, which solvent is thereafter evaporated prior to the oxidation step. In addition, super atmospheric pressure may be used if desired in any of the oxidation methods employed including those forestated.

The polyethylenes operable in the instant invention have a density in the range 0.91–0.930 g./cc., a melting point in the range 90–120° C. and a melt index in the range 0 to 100 prior to the oxdiation step.

The thus blended polymer-carboxylate salt of cobalt or manganese mixture with or without a promoter is then subjected to oxidation as aforestated. If ozone is used as a promoter, it is incorporated into the oxygen-containing air stream. Since the rate of oxidation increases with increasing temperature, it is preferred to carry out the oxidation at as high a temperature as possible without melting the polymeric material. Thus, temperatures within 5–20° C. below the crystalline melting point of the polymer are preferably employed. However, we have found that temperatures as low as 60° C. are operable in carrying out the instant invention, only necessitating a longer oxidation period.

The oxidation step can be terminated at any operable degree of oxidation within the limits of the aforestated carboxyl content. Subsequent stabilization against further oxidation is generally desirable. For example, a suitable antioxidant such as 4,4' - thiobis - (6-t-butyl-metacresol) sold under the trade name "Santonox" by Monsanto Chemical Co. or N-phenyl-2-naphthylamine can be added to the oxidized polyethylene. However, a simple melting step such as an extrusion without additives is generally sufficient to stabilize the polymer against continued oxidation.

The oxidized polyethylene of the instant invention wherein the carboxyl content is 0.1 to 0.2 milliequivalents/g. polyethylene is readily emulsified in a continuous aqueous phase in the presence of suitable well known emulsifiers by the wax-to-water method. Both ionic and non-ionic emulsifying agents are operable to emulsify the oxidized polymer. Ionic emulsifiers include, in the anionic class, fatty acids used in combination with amines. Morpholine, monoethanol amine, 2 - amino - 2-methyl-1-propanol and the like are suitable amines. Operable fatty acids include oleic acid, stearic acid, tall oil fatty acid and the like higher fatty acids. Operable ionic emulsifiers in the cationic class include but are not limited to acetate salts of long chain imidazolines. Polyoxyethylene ethers of long chain alcohols, polyoxyethylene ethers of alkyl aryl phenols or combinations thereof are examples of a few nonionic emulsifiers operable in this invention. The amount of emulsifier employed is from 5 to 50 parts, preferably 10 to 30 parts emulsifier per 100 parts oxidized polyethylene by weight.

Base must be added to the anionic and nonionic emulsions in an amount in the range from 40 to 200% of the theoretical amount required to neutralize the carboxylic acid groups on the polymer. When anionic emulsifiers such as fatty acids are used, one generally adds sufficient amine to neutralize both the fatty acid and the polymer carboxyl groups.

The oxidized polyethylene of the instant invention is emulsified by the well known wax-to-water method. In said method the oxidized polyethylene and emulsifier are heated together at a temperature above the melting point of the polymer, e.g. 120–150° C. Any base necessary is thereafter added to the heated mixture and the resulting mixture is poured into vigorously stirred water maintained at a temperature of about 90–99° C. for emulsification. The thus formed emulsion is cooled rapidly to room temperature with stirring. The equeous emulsions of the instant invention contain 10–50% total solids by weight.

The following examples are set down to illustrate the invention but are not deemed to limit its scope. Tests throughout the instant invention were conducted as follows.

The extent of oxidation of polyethylene was determined by ascertaining the carboxyl content of the polymeric material by titration with base in the following manner. About 1 g. of the polymer to be analyzed was accurately weighed and dissolved in 200 ml. of xylene by heating to 120–130° C. with stirring in a 500 ml. Erlenmeyer flask on a magnetic stirrer-hot plate. About 15 drops of 0.1% phenolphthalein in absolute ethanol was added. While continuing stirring and maintaining the temperature at 120–130° C., the solution was titrated to a pink end point with standard 0.05 N potassium hydroxide in absolute ethanol.

Calculation:

$$\text{milliequivs. COOH per g.} = \frac{(\text{ml. of KOH})(\text{N of KOH})}{(\text{g. of polymer})}$$

Melt indices (MI) were measured under the conditions specified in ASTM D1238–57T under Condition E (melt index, i.e. MI) except that for melt indexes above about 100, Condition A was used and converted to an approximate melt index by the equation log MI=0.830 log F+ 1.825, where F is the flow rate in g./10 min. at 125° C. with a 325 g. load.

Densities of the polymer in g./cc. were measured under the conditions specified in ASTM D1505–57T.

Reduced specific viscosity, i.e. RSV, in deciliters/g. was obtained by dissolving 0.1 g. of the polymer in 100 cc. Decalin at 135° C. in accord with the procedure of ASTM D1601–61.

The crystalline melting point of the polymer was measured as the temperature at which birefringence disappears from the sample when viewed through crossed Nicol prisms in a hot stage microscope heated at a rate of 1° C./min.

The viscosity of the polyethylene emulsions was measured at 23° C. with a Brookfield Viscometer model LVT using spindle No. 1 at 60 r.p.m.

The percent of the oxidized polyethylene which is emulsified is measured by filtering the emulsion through a 100 mesh screen at 25° C.

Percent emulsified = 100 −

$$\left(\frac{\text{g. oxidized polymer retained on 100 mesh screen}}{\text{total g. oxidized polymer employed in recipe}}\right) \times 100$$

Unless otherwise noted, all parts and percentages are by weight.

Example 1

Commercially available polyethylene having a density of 0.925, a melt index of 22 and a melting point of 117° C. was blended in the melt in a Banbury mill with sufficient cobalt stearate that the blend contained 0.01% cobalt. The blended polymer was cooled then ground through a 20 mesh screen. 1,000 g. of the thus screened polymer blend was heated in a rotating glass reactor at 80° C. under oxygen. After 13 hours the carboxyl content of the polymer was 04.8 millequivalent/g. and the melt index was 3,000. 50 g. of the oxidized polymer and 10 g. of oleic acid were melted together at about 130–140° C. Morpholine (20 g.) was added to the wax melt at 120–130° C. and mixed therewith for about 2 minutes. The wax melt at 115–125° C. was then poured into 255 g. of water heated to a temperature of 96–98° C. with rapid mechanical stirring. After the wax had been added, the mixture was cooled rapidly to 40° C. with stirring. By passing the emulsion through a 100 mesh screen, it was found that more than 99% of the original polymer had been emulsified. The emulsion had low viscosity, small particle size and very good shelf stability.

Example 2

Commercially available polyethylene having a density of 0.925, a melt index of 22 and a melting point of 117° C. was blended in the melt on a Banbury mixer with sufficient cobalt stearate that the blend contained 0.001% cobalt. The polymer was cooled then ground through a 20 mesh screen. 1,000 g. of the thus screened polymer was heated in a rotating glass reactor at 100° C. under ozone-enriched oxygen. After 15 hours oxidation at 100° C. the polymer contained 0.55 millequivalent carboxyl/g. of polymer and had a melt index of 4500. 50 g. of the thus oxidized polymer and 10 g. of oleic acid were melted together at about 130–140° C. 20 g. of morpholine was added to the wax melt at 120–130° C. and mixed therein for about 2 minutes. The wax melt at 115–125° C. was poured into 225 g. of water at 96–98° C. with rapid mechanical stirring. After the wax had been added, the mixture was cooled rapidly to 40° C. with vigorous agitation. By passing the emulsion through a 100 mesh screen, it was found that more than 98% of the original polymer had been emulsified. The emulsion had low viscosity, small particle size and good shelf stability.

Example 3

Example 2 was repeated except that cobalt naphthenate was substituted for the cobalt stearate to add 0.001% cobalt to the polymer blend. In addition, the oxidation was performed for 38 hours in oxygen at 100° C. The thus oxidized polymer had a carboxyl content of 0.79 milliequivalent/g. of polymer and a melt index of 8400. Upon emulsification as in Example 2 it was found that more than 99% of the original polymer had been emulsified. The emulsion had low viscosity, small particle size and good shelf stability.

The following example shows the inability of forming a stable polymer emulsion by the wax-to-water technique in the absence of a carboxylate salt of cobalt or manganese.

Example 4

200 lbs. of a commercially available polyethylene having a density of 0.925, a melt index of 22 and a melting point of 117° C. was ground to pass a 20 mesh screen. The thus screened polymer was coated with 2% benzoyl peroxide based on the weight of the polymer applied in a benzene solution. The polymer was oxidized in oxygen in a ribbon blender at 100° C. After 156 hrs., the carboxyl content of the polymer was 0.50 milliequivalent/g. of polymer and the melt index was 4800. 50 g. of the thus oxidized polymer and 10 g. of oleic acid were melted together at about 130–140° C. 20 g. of morpholine were added to the wax melt at 120–130° C. and mixed for about 2 minutes. The wax melt at 115–125° C. was poured into 225 g. of water at 96–98° C. with rapid mechanical stirring. After the wax had been added, the mixture was cooled rapidly to 40° C. with stirring. On screening it was found that only 81% of the original polymer had been emulsified. The emulsion contained large particles of polymer and creamed upon standing.

To show the effect of the type and concentration of the carboxylate salt of cobalt and manganese upon the oxidation rate, oxygen uptake studies were made in an Abderhalden-type drying pistol connected to a gas buret. The desiccant portion of the pistol was filled with a mixture of Ascarite and Drierite to absorb carbon dioxide and water. The pistol was filled with oxygen, and as the oxygen was consumed the mercury level in the gas buret was raised to maintain 1 atmosphere pressure. The carboxylate salts of cobalt or manganese were blended into the 0.925 density polymer having a melt index of 22 and a melting point of 117° C. by milling on a Brabender Plastograph at a temperature in the range 120–150° C. The polymer was cooled, then ground through a 20 mesh screen and coated with 0.5% benzoyl peroxide based on the weight of the polymer added as a benzene solution. The results of the oxygen uptake studies are shown in the table.

TABLE

| Soap | Percent metal | Total oxidation time (hrs.) | Final carboxyl (meq./g.) | Oxidation rate (meq. COOH/g./hr.) |
|---|---|---|---|---|
| None | 0 | 24 | 0.04 | 0.002 |
| Cobalt stearate | $10^{-2}$ | 4 | 0.49 | 0.12 |
| Do | $10^{-3}$ | 4 | 0.49 | 0.12 |
| Do | $10^{-4}$ | 8 | 0.23 | 0.03 |
| Do | $10^{-5}$ | 24 | 0.11 | 0.005 |
| Do | $10^{-6}$ | 24 | 0.04 | 0.002 |
| Cobalt naphthenate | $10^{-2}$ | 2 | 0.26 | 0.13 |
| Do | $10^{-3}$ | 23 | 0.98 | 0.04 |
| Do | $10^{-4}$ | 23 | 0.26 | 0.01 |
| Manganese naphthenate | $10^{-2}$ | 4 | 0.20 | 0.05 |
| Do | $10^{-3}$ | 24 | 0.22 | 0.01 |
| Do | $10^{-4}$ | 24 | 0.07 | 0.003 |

To obtain a detectable increase in oxidation rate at least $10^{-5}\%$ cobalt is required. It does not appear that there is any advantage in using a concentration greater than $10^{-2}\%$ cobalt. Higher concentrations of the carboxylic salt of cobalt or manganese may be detrimental in that they may produce color and continued oxidation during storage.

We claim:

1. The method of forming an emulsifiable polyethylene from polyethylene having a density in the range 0.910 to 0.930 and a melt index in the range 0–100 which comprises melt blending said polyethylene with $10^{-5}$–$10^{-2}\%$ of a member of the group consisting of cobalt and manganese as the carboxylate salt based on the weight of the polymer and thereafter heating said polymer containing said salt in dry solid particulate form in the presence of a free oxygen-containing gas at a temperature ranging from 60° C. up to but not including the crystalline melting point of said polyethylene until the carboxyl content of the polymer is in the range of 0.1 to 2.0 milliequivalent carboxyl/g. of polymer.

References Cited

UNITED STATES PATENTS 3,322,711  5/1967  Bush et al.

FOREIGN PATENTS 581,279  10/1946  Great Britain.
968,960  9/1964  Great Britain.

MURRAY TILLMAN, Primary Examiner

H. ROBERTS, Assistant Examiner

U.S. Cl. X.R.

260—29.6